UNITED STATES PATENT OFFICE.

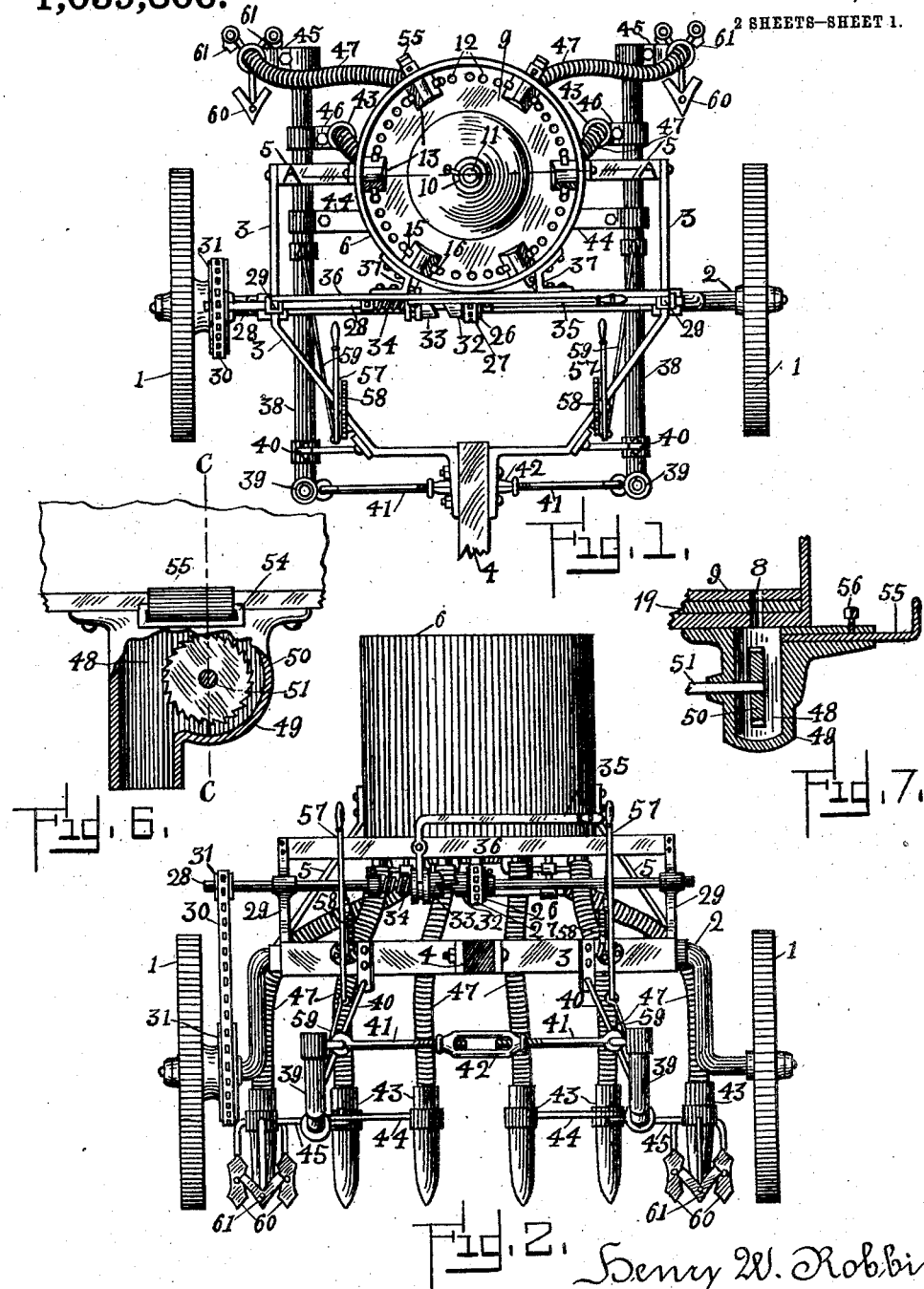

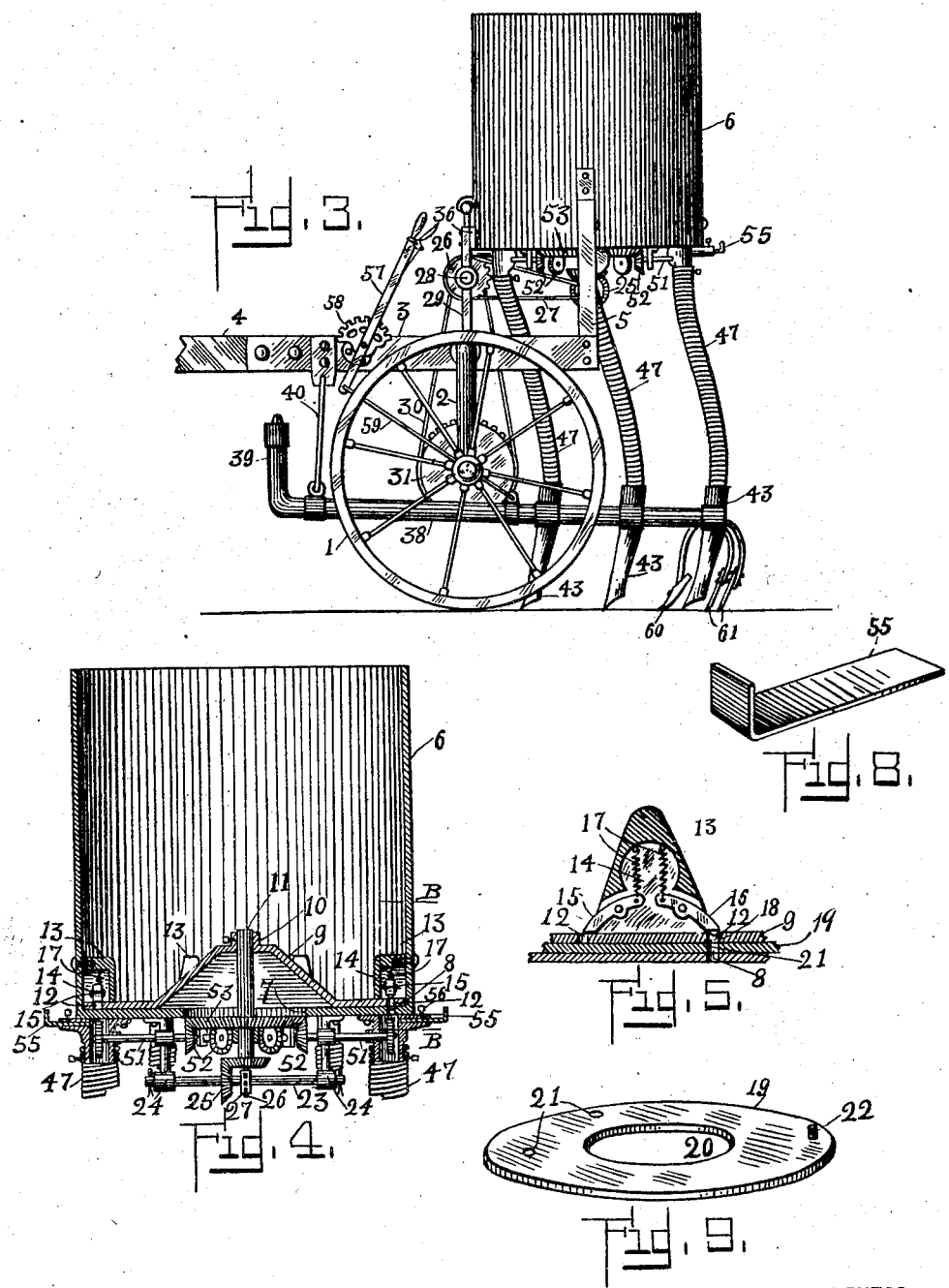

HENRY W. ROBBINS, OF ARLINGTON, TEXAS.

SEED-PLANTER.

1,039,806.

Specification of Letters Patent. Patented Oct. 1, 1912.

Application filed September 30, 1911. Serial No. 652,058.

*To all whom it may concern:*

Be it known that I, HENRY W. ROBBINS, a citizen of the United States, residing at Arlington, in the county of Tarrant and State of Texas, have invented certain new and useful Improvements in Seed-Planters, of which the following is a specification.

My invention relates to new and useful improvements in seed planters.

The object of the invention is to provide a planter adapted for use either in planting such seed as cotton and corn, or in drilling grain.

Another object of the invention is to provide a novel mechanism by which corn or cotton seed may be fed one kernel at a time into a feed chute, and to provide a mechanism also for discharging small quantities of grain into the seed chute at regular intervals in drilling.

A further object of the invention is to provide an improved form of flexible chute, by the use of which it is made possible to raise or lower the lower ends of the several chutes simultaneously without hindering the passage of seed through the same.

Other objects of the invention lie in the provision of a device for preventing the cotton seed from packing in the upper extremities of the seed chutes, and a novel form of ejector for dislodging the seed from the apertures in the seed plate.

Finally the object of the invention is to provide a device of the character described that will be strong, durable, simple and efficient, and comparatively easy to construct, and also one the various parts of which will not be likely to get out of working order.

With these and various other objects in view, my invention has relation to certain novel features of the construction and operation, an example of which is described in the following specification, and illustrated in the accompanying drawing, wherein:

Figure 1 is a top view of a planter, in which are embodied the improved features constituting the present invention. Fig. 2 is a front view of the same. Fig. 3 is a side elevation of the same. Fig. 4 is a vertical sectional view of the seed can taken on the line A—A of Fig. 1, showing a mechanism for operating the feeding and agitating device within the can. Fig. 5 is a detail sectional view taken on the line B—B of Fig. 4, showing a pair of spring actuated dogs, one of which serves to limit the number of seed entering the apertures provided in the seed plate to receive the same, the other serving to eject the seed from said apertures at a point above the seed chutes. Fig. 6 is a detail view of the upper portion of one of the flexible tubes, a portion of the same being removed to show the toothed wheel mounted therein. Fig. 7 is a vertical sectional view of the toothed wheel taken on the line C—C of Fig. 6. Fig. 8 is a detail perspective view of a slide bar, adapted to close one of the apertures by which the seed are discharged from the can. Fig. 9 is a detail perspective view of an apertured circular plate, which is placed in the bottom of the seed can, when the planter is being used for cotton seed or corn.

Referring now more particularly to the drawing, wherein like numerals of reference designate similar parts in all the figures, the numeral 1 denotes the transporting wheels of the planter, which wheels are rotatable upon the extremities of an arched axle 2. Upon said axle is supported a frame, consisting of two symmetrically disposed members 3, receiving the axle at their middle portions, and having their forward portions converging and secured at their extremities to the rear end of the tongue 4. A pair of brackets 5 respectively attached to the rear extremities of the frame members 3, serve to furnish a rigid support to a vertically mounted seed can or hopper 6. The seed can 6 occupies a position just at the rear of the axle and a short distance above the same. The bottom of the seed can 6 is provided with a central circular aperture 7, several inches in diameter, and contains also a plurality of smaller apertures 7, adjacent to its periphery, the apertures 8 being equidistant from each other. Upon the bottom of the seed can, there rests a circular seed plate 9, having a diameter substantially equal to the inner diameter of the seed can, and having a conical central portion, at the apex of which, an integral set-collar 10 is provided to receive a short vertical shaft 11. A mechanism will presently be described by which rotation may be communicated from one of the transporting wheels to the shaft 11 and to the seed plate 9. Adjacent to the periphery of the feed plate 9, a considerable number of small equidistant apertures 12 are provided, which apertures will be successively brought into alinement with the apertures 8 of the seed can bottom when the feed plate 9 is subjected to rotation. At the bottom of the seed can, a plurality of small metallic boxes 13 are rigidly attached to inner surface of the can, said boxes having their side walls converging upon lines radial with the seed can, and being disposed one above each aperture 8. The boxes 13 are contiguous at their bottoms with the plate 9, so that during the rotation of said plate, the apertures 12 will successively pass through the chambers 14, constituting the interiors of the boxes. Within the lower portion of each chamber 14 a pair of dogs 15 and 16 are centrally pivoted, said dogs being at an inclination with the horizontal, and having a constant upward pull exerted upon their upper ends by a pair of coiled springs 17 extending to the top of the chambers 14. Owing to the tension of the springs 17, a constant pressure is maintained upon the plate 9 by the lower extremities of the dogs 15 and 16, which extremities project slightly from their correlated box at each side thereof.

When the seed can is full, and the plate 9 is subjected to rotation, the seed which have settled into the apertures 12 of the seed plate will be carried into the chambers 14 by rotation of said plate. Since the apertures 12 pass beneath the lower extremities of the dogs 15 and 16, the amount of seed carried by these apertures may be limited by the dog 15, which will throw out any seed only partially recessed in the apertures 12. When the apertures containing the seed reach the dog 16, which dog will be located directly above one of the apertures 8, a small bead 18 carried by the lower end of the dog 16 will momentarily enter the aperture 12 containing the seed, and force the seed down from said aperture through the aperture 8, and out of the can. The dog 16, therefore, with its correlated spring 13 has the function of an ejector to discharge the seed from the plate 9.

When the planter is being used to plant cotton seed or corn, such seed will be discharged from the seed can at less frequent intervals than is necessary for planting grain. Since the apertures 8, provided in the bottom of the seed can, are sufficient for the purpose of drilling grain, it is necessary to close up a number of these apertures in planting cotton seed or corn. To accomplish this result, a circular plate 19 is interposed between the bottom of the can and the plate 9, the plates 19 and 9 being of equal diameter. The plate 19 contains a central aperture 20, equal in size and form to the aperture 7 in the bottom of the seed can. The plate 19 is also provided near its periphery with two apertures 21, adapted to register with two of the apertures in the bottom of the seed can, which will be more particularly specified hereinafter. In order to hold the plate 19 stationary, and prevent rotation from being communicated thereto by the plate 9, a pin 22 is provided upon the under surface of the plate 19 adjacent to the periphery thereof, said pin being adapted to enter one of the apertures 8 in the bottom of the seed can. When the circular plate 19 is interposed between the bottom of the can and the plate 9, it is apparent that only two of the apertures 8 may be employed as seed discharge apertures.

A power transmission mechanism will now be described, which mechanism is employed to communicate rotation to the vertical shaft 11 from one of the transporting wheels.

Centrally beneath the seed can, and adjacent to the bottom thereof, a short horizontal shaft or spindle 23 is rotatably mounted in a pair of brackets 24, depending from the seed can. A pair of small miter gears 25 are adapted to communicate rotation from the spindle 23 to the shaft 11. A sprocket wheel 26, upon which is mounted a chain 27, is adapted to communicate rotation to the spindle 23 from a shaft 28, parallel with said spindle, and rotatably supported at its extremities by brackets 29, projecting upwardly from the frame members 3 in vertical alinement with the axle. The shaft 28 receives rotation from one of the transporting wheels through a chain 30 carried by a sprocket wheel 31. In order that the transmission of rotation from the transporting wheel to the seed plate 9 may be discontinued at the will of the operator, a clutch mechanism is mounted upon the shaft 28, which will now be described. The sprocket wheel 26 carried by the shaft 28 is loose upon said shaft, and is provided with an integral clutch collar 32. A sliding clutch member 33 is splined upon the shaft 28, adjacent to the clutch collar 32, and is acted upon in the usual manner by a spring 34 coiled upon the shaft 28 and tending to force the clutch member 33 into engagement with the member 32. A substantially horizontal lever 35, which is pivotally mounted upon a horizontal bar 36, supported by the upper extremities of the brackets 29, has its pivotal extremity projecting downward beyond the pivotal point, and engaging the sliding clutch member in the usual well known manner. It is to be understood that the planter need not be limited for successful operation to the particular form of clutch shown in the drawing, but any well known clutch may be used to accomplish the desired result. A pair of braces 37 establish a connection between the bar 36 and the front portion of the seed can, serving to strengthen the can and assist in holding it rigidly in its proper position.

Beneath the frame members 3 of the planter, and a short distance above the ground are mounted a pair of parallel beams 38, transversely disposed in regard to the axle. The forward extremities of the beams 38, each contain a right angled bend, causing said extremity to project upwardly a short distance as indicated at 39. A pair of swinging rods 40 support the forward extremities of the beams 38 at the proper elevation above the ground, the upper extremities of the rods 40 being loosely attached to the converging portions of the frame 3. The forward extremities of the beams 38 are adapted to be adjusted with regard to space between said extremities, this being accomplished by providing a connection between said extremities consisting of a pair of rods 41 and a common turn-buckle 42. Each of the beams 38 furnishes a rigid support for three tubes 43, having openings provided in their lower extremities, which are beveled, and being of such a length that said extremities will produce slight furrows in the ground when the machine is in motion, and the beams are in their lowered position. In order that these tubes may better resist the strain to which they are subjected in producing the aforesaid shallow furrow, the tubes are given a slight inclination forwardly from top to bottom. The tubes are disposed upon the two beams in symmetrical relation to each other. The forward pair of tubes 43 are rigidly supported from the beams 38 by means of a pair of brace bars 44. The two tubes just mentioned are located a short distance apart centrally beneath the seed can. The rear pair of tubes 43 are supported by brackets 45, projecting outwardly from the rear extremities of the beams 38. The middle pair of tubes 43 are supported just inside of the beams 38 by brackets 46 at points midway between the forward and rear tubes 43.

From the above description, it is apparent that the tubes 43 are arranged substantially in the form of a V, having its apex at a point beneath the center of the axle, and its members extending rearwardly therefrom. The upper extremity of each tube 43 has rigid connection with the lower end of a coiled spring 47, the coils of which spring are closed, forming a flexible chute leading to the seed can. The upper end of each chute 47 communicates with the bottom of a chamber 48 within a small casing 49 secured to the bottom of the seed can, and adapted to communicate with the interior thereof through one of the apertures 8. Within each of the chambers 48, a toothed wheel 50 is rigidly mounted upon a spindle 51 extending toward the shaft 11, the wall of the casing 49 forming a bearing for said spindle. The spindles 51 are all of equal length, and each carries upon its inner end a beveled pinion 52, spaced from the shaft 11. All of these pinions 52 are in mesh with a bevel gear 53, rigid upon the vertical shaft 11, and adapted to communicate rotation from said shaft to the spindles 51. Although the toothed wheels 50 will be in constant rotation during the travel of the planter, they will have a useful function only when the planter is used to plant cotton. The cotton seed, owing to the lint adhering thereto, has a tendency to pack, or catch in the upper portion of the seed can, and this tendency is counteracted by the rotating wheels 50, which engage each cotton seed as it drops through one of the apertures 8 and impels the same downwardly through the chute.

At the top of each casing 49, just below the seed can, a slot 54 is provided in the outer wall of said casing, which slot receives a slide-bar 55 adapted, when adjusted inwardly, to cover the adjacent aperture 8, and prevent the egress of seed through said aperture. A set-screw 56 is vertically mounted in the projecting portion of the casing 49 and is adapted to bear upon the slide-bar to hold the same in various positions of sliding displacement.

Upon the forward portions of the frame members 3 are pivotally mounted a pair of levers 57, the pivotal axes of said levers being perpendicular to the tongue. A toothed quadrant 58 is mounted upon each frame member 3 adjacent to the pivotal point of the lever 57, which quadrant will act in conjunction with the usual spring-pressed rod to hold the lever in various positions of adjustment. The lower extremities of the two levers are respectively connected to the middle portions of the two beams 38 by swinging rods 59, so that, by manually subjecting the levers to an angular displacement, the beams 38 may be individually raised or lowered.

From the above description, the operation of the planter mechanism will be readily understood. Since the machine may be used both to drill and to plant, it accomplishes the work of two implements. In conjunction with each of the rear tubes 43, are employed three small plows, comprising a front plow 60, adapted to produce a furrow to receive the seed and a pair of rear plows 61, adapted to cover the furrow after the seed have been deposited therein. When the machine is being used for planting corn or cotton seed, the rear chutes 47 and the rear tubes 43 will alone be used, and the other tubes and chutes may be removed from the planter at the option of the operator.

It is obvious that various changes may be made in the form and construction of parts and details of the above described invention without departing from the spirit or sacrificing the advantages thereof, and the device is therefore presented as including all such changes and modifications as come within the scope of the following claims.

What I claim is:

1. A feeding-device for a seed planter, comprising a hopper with a plurality of apertures in its bottom, a revolving plate held contiguous to the under side of said hopper, the plate being supplied with a plurality of apertures, which correspond in size and position to those in the bottom of the hopper, an auxiliary plate that may be interposed between the revolving plate and the bottom of the hopper, and a plurality of flexible chutes leading from the underside of the hopper, and adjacent to the apertures thereof.

2. A feeding-device for a seed planter, comprising a hopper with a plurality of apertures in its bottom, a revolving plate held contiguous to the under side of the hopper, the plate being supplied with a plurality of apertures, which correspond in size and position to those in the bottom of the hopper, a series of flexible chutes leading from the under side of the hopper, a toothed wheel rotatably mounted in the upper portion of each flexible chute, means to rotate said wheel, a box mounted upon the inner side of the wall of the hopper, and adjacent to each chute, and spring actuated ejectors mounted in each box, the lower end of said ejectors communicating with the apertures in the revolving plate as the latter is revolved.

In testimony whereof I have signed my name to this specification in the presence of two subscribing witnesses.

HENRY W. ROBBINS.

Witnesses:
L. MORRIS,
JAS. T. POMEROY II.